United States Patent [19]

Kawai

[11] Patent Number: 5,091,842
[45] Date of Patent: Feb. 25, 1992

[54] DEVICE FOR REMOVING D.C. COMPONENTS FROM OUTPUT OF MULTI-PHASE INVERTER

[75] Inventor: Joji Kawai, Kobe, Japan

[73] Assignee: Mitsubishi Denki Kabushiki Kaisha, Japan

[21] Appl. No.: 515,457

[22] Filed: Apr. 26, 1990

[30] Foreign Application Priority Data

Apr. 27, 1989 [JP] Japan .................. 1-109726

[51] Int. Cl.⁵ .......................... H02M 7/5395
[52] U.S. Cl. ........................... 363/98; 363/41; 363/132
[58] Field of Search ............... 363/98, 132, 39, 40, 363/41, 37

[56] References Cited

U.S. PATENT DOCUMENTS

| | | | |
|---|---|---|---|
| 3,967,173 | 6/1976 | Stich | 363/98 |
| 4,443,842 | 4/1984 | Jessee | 363/98 |
| 4,597,037 | 6/1986 | Okado | 363/41 |
| 4,652,770 | 3/1987 | Kumano | 307/66 |
| 4,803,611 | 2/1989 | Sashida et al. | 363/98 |
| 4,816,985 | 3/1989 | Tanahashi | 363/81 |
| 4,905,135 | 2/1990 | Unehara et al. | 363/17 |

FOREIGN PATENT DOCUMENTS 60-249874 12/1985 Japan .

*Primary Examiner*—Peter S. Wong
*Attorney, Agent, or Firm*—Leydig, Voit & Mayer

[57] ABSTRACT

A device for removing D.C. components from output voltages of a multi-phase inverter which converts a D.C. voltage into first to N-th phases of A.C. voltages comprises first to (N−1)th detectors connected between the first-phase output line of the multi-phase inverter and the second- to N-th-phase output lines of the multi-phase inverter, respectively. The device also comprises controllers for respectively controlling the second- to N-th-phase output voltages of the inverter in such a manner that the D.C. components detected by the first to (N−1)th detectors are nullified.

5 Claims, 3 Drawing Sheets

FIG. I

DEVICE FOR REMOVING D.C. COMPONENTS FROM OUTPUT OF MULTI-PHASE INVERTER

BACKGROUND OF THE INVENTION

1. Field of the Invention

The present invention relates to a device for removing D.C. components from output voltages of a multi-phase inverter which produces a multi-phase A.C. voltage from a D.C. voltage.

2. Description of the Related Art

FIG. 4 is a block diagram of a known single-phase inverter conventionally used as a welding power supply and of a D.C. component removing device connected to the inverter. A power rectifier 101 is connected to a three-phase power supply 102 through switches 103. A D.C. voltage derived from the power rectifier 101 is converted into an A.C. voltage $V_1$ by an inverter 105 which has four switching elements 105a to 105d. The A.C. voltage $V_1$ is supplied to the primary winding 107a of a transformer 107, so that a voltage is generated in the secondary winding 107b of the transformer 107. The voltage thus generated is changed again into a D.C. voltage through diodes 108a and 108b. The positive side of this D.C. voltage is connected to a welding wire 111 through a reactor 109 and a contactor 110, while the negative side of the same is connected to the welding base material 114 through a shunt resistor 113. In consequence, a welding current I is caused to flow between the wire 111 and the welding base material 114 so that the wire 111 is molten to effect welding.

During the welding, the welding current I is detected by the shunt resistor 113. The detected current component is amplified by an amplifier 116 and is supplied as a feedback signal If to a PI (Proportional-plus-Integral) operation unit 117. The operation unit 117 determines the difference between the feedback signal If and a reference value Is which is beforehand set in the welding current setting device 118. The PI operation unit 117 then conducts proportional and integration arithmetic operation so as to produce an operation signal $\Delta e$ which is supplied to an adding point 138.

On the other hand, the positive and negative components of the current $I_1$ flowing in the primary winding 107a of the transformer 107 are detected by current detectors 131 and 132, respectively. The detection output $S_B$ from the current detector 132 is subtracted at an adding point 133 from the detection output $S_A$ of the current detector 131 so that the difference between the outputs $S_A$ and $S_B$ is determined. The thus obtained difference is integrated by an integrator 134 so that a signal $S_I$ representing the integrated value is obtained.

The signal $S_I$ representing the integrated value is supplied to one end of a switching element 135 which takes on and off states, respectively, when the polarity of the current $I_1$ in the winding is negative and positive. The signal $S_I$ also is supplied, through a polarity inversion amplifier 137, to one end of a switching element 136 which takes on and off states, respectively, when the current $I_1$ is positive and negative. The switching elements 135 and 136 are connected to each other at their other ends, so that these elements in cooperation produce a signal $SI_a$ representing the integrated value which is supplied to the adding point 138.

Thus, the integrated value signal $SI_a$ is subtracted at the adding point 138 from the operation signal $\Delta e$ derived from the PI operation unit 117, so that a signal Se is produced and delivered to an adding point 119. At the adding point 119, the signal Se is added to a triangular wave TW generated by a triangular wave generator 120 and the sum is supplied to a comparator 121. When a condition $(TW+Se)>0$ is met, i.e., on condition of $TW > -Se$, the comparator 121 supplies a signal of "L" level and delivers it to a pulse distributor 122. The pulse generator 122 then conducts an operation to alternately turn on and off the switching elements 105a, 105d or 105b, 105c in the inverter 105, thereby to form the output voltage $V_1$.

The operation of the conventional device will be described with reference to waveform chart shown in FIG. 5.

It is assumed here that there is no offset in the output voltage $V_1$ of the inverter 105. In this case, the waveform of the voltage $V_1$ has such a waveform that the positive and negative pulses have an equal pulse width, as shown by a broken line, so that these pulse negate each other. In consequence, the integrated value SI and the integrated value signal SIa are zero at the end of each period, as shown by broken lines. In consequence, the signal Se substantially conforms with the operation signal $\Delta e$ so that a balance is maintained between the positive and negative components.

A description will be given of the case where the output voltage $V_1$ of the inverter 105 has such a waveform that, as shown by a solid line, the widths of the positive and negative pulses are widened and narrowed, respectively, as compared with those of the waveform shown by the broken line. In this case, the value obtained through integration of the positive pulses is greater than that obtained through integration of the negative pulses, so that the integrated value SI progressively increases in the negative direction. This integrated value SI is oscillated to positive and negative sides by the operation of the switching elements 135 and 136, as well as the polarity inversion amplifier 137, whereby the integrated signal SIa is formed. Then, the signal Se is obtained as a result of subtraction of the integrated signal SIa from the operation signal $\Delta e$. The pulse distributor 122 then delivers a signal SG when the triangular wave TW is greater than $-Se$, i.e., when the condition $TW > -Se$ is met. Then, the inverter switching elements 105a and 105d or 105b and 105c are alternately turned on and off to produce a voltage $V_1$.

When the voltage VI is positive, the signal $-Se$ is greater than the operation signal $-\Delta e$, whereas, when the voltage $V_1$ is negative, the signal $-Se$ is smaller than the signal $-\Delta e$, so that a control is effected in such a manner as to narrow the positive pulses while widening the negative pulses. Thus, the operation signal $\Delta e$ and the integrated value signal SIa are superposed on each other to enable a control for attaining a balance between the positive and negative pulses thereby nullifying the integrated value signal SIa. In consequence, it is ensured that the positive and negative pulses always have an equal pulse width, so that the transformer 107 can operate satisfactorily without any magnetic offset.

Thus, the conventional device for removing D.C. component is intended only for single-phase inverters and are not designed to adapt to a multi-phase inverter.

Namely, in case of a multi-phase inverter, e.g., 3-phase inverter, it is necessary to correct unbalance of D.C. components of all the three phases.

It is also necessary that the control is conducted such that the sum of the currents in the three phases is zero.

In consequence, quite a complicated device is required for removing D.C. components from multi-phase output of a multi-phase inverter.

Furthermore, a problem due to mutual interference between a plurality of phases also is encountered.

SUMMARY OF THE INVENTION

Accordingly, an object of the present invention is to provide a device for removing D.C. components adaptable to multi-phase inverters such as 3-phase inverters.

To this end, according to the present invention, there is provided a device for removing D.C. components from output voltages of a multi-phase inverter which converts a D.C. voltage (where N=the number of voltage phases) into first to N-th phases of A.C. voltages comprising: first to (N−1)th detectors connected between the first-phase output line of the multi-phase inverter and the second- to N-th-phase output lines of the multi-phase inverter, respectively; and control means for respectively controlling the second- to N-th-phase output voltages of the inverter in such a manner that the D.C, components detected by the first to (N−1)th detectors are nullified.

These and other objects, features and advantages of the present invention will become clear from the following description of the preferred embodiment when the same is read in conjunction with the accompanying drawings.

BRIEF DESCRIPTION OF THE DRAWINGS

Referring to FIG. 1, a D.C. power supply 2 is connected to a 3-phase inverter 1 having six switching elements. One end of a first-phase output line 41 is connected to the juncture between the first-phase switching elements UP and UN of the inverter 1 through a filter 3. Similarly, one ends of a second-phase output line 42 and a third-phase output line 43 are respectively connected to juncture between the second-phase switching elements VP and VN and the juncture between third-phase switching elements WP and WN through the filter 3. The other ends of these output lines 41 to 43 are connected to an output transformer 4. A PT (Potential Transformer) 5 for detecting the voltages of the respective phases are connected to the output transformer 4.

Figure 1:
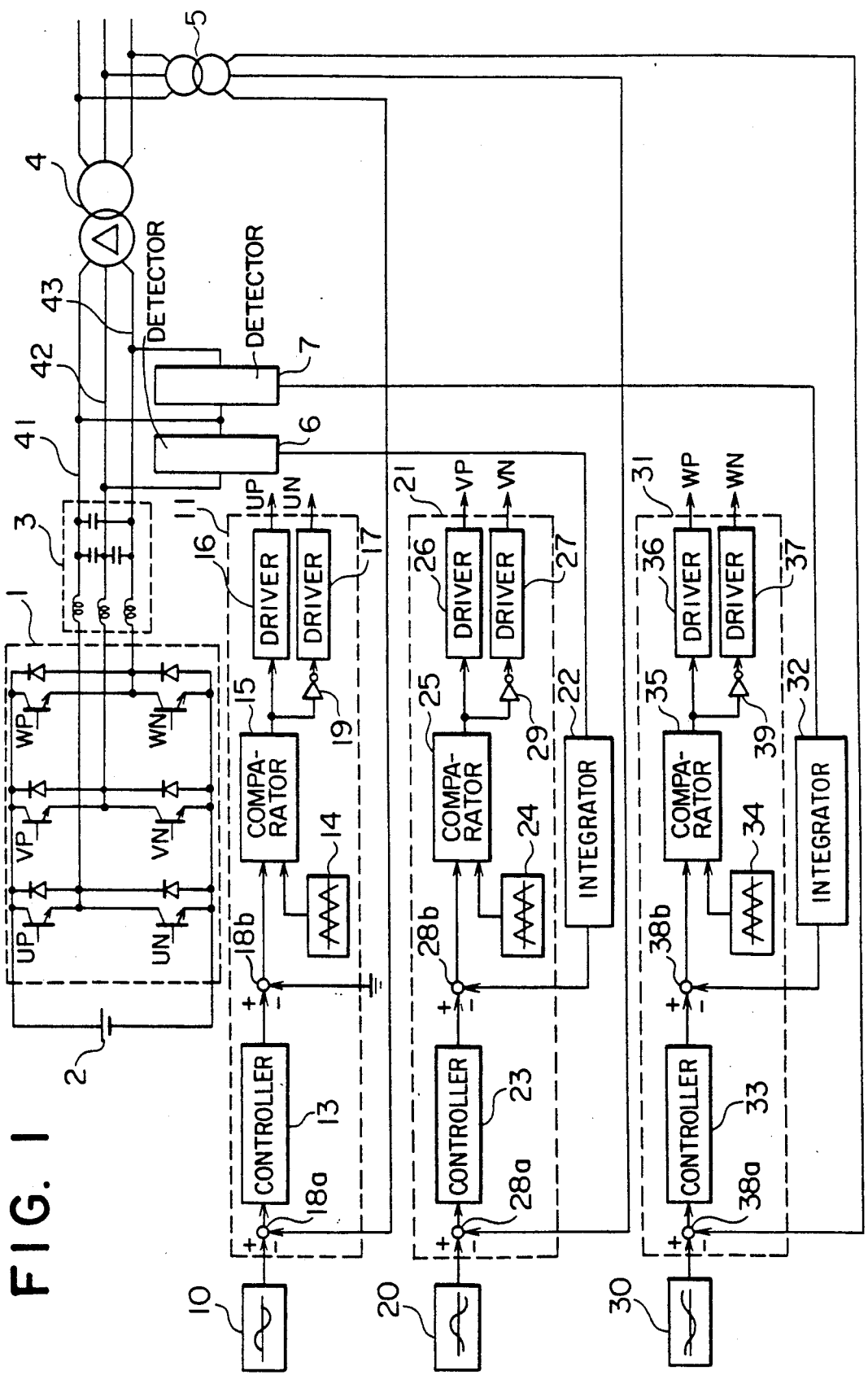
FIG. 1 is a block diagram of a 3-phase inverter having an embodiment of a device of the invention for removing D.C. components.

A first D.C. component detector 6 is connected between the first- and second-phase output lines 41 and 42 of the inverter 1. Similarly, a second D.C. component detector 7 is connected between the first- and third-phase output lines 41 and 43.

The first-phase output of the PT 5 is connected to the adding point 18a of a first control circuit 11. A first reference sine wave generator 10 also is connected to the adding point 18a. The adding point 18a is connected to a controller 13 which is connected through an adding point 18b to a first input terminal of a comparator 15. At the same time, a triangular carrier wave generating circuit 14 is connected to the second input terminal of the comparator 15. The output terminal of the comparator 15 is connected through a driver 16 to the switching element UP of the inverter 1 and connected also to the switching element UN of the inverter 1 through an inversion amplifier 19 and a driver 17.

A second control circuit 21 has the same construction as the first control circuit 11. Namely, it has adding points 28a, 28b, a controller 23, a triangular carrier wave generator 24, a comparator 25, drivers 26, 27 and an inversion amplifier 29. The second-phase output of the PT 5 and a second reference sine wave generator 20 are connected to the adding point 28a of the second control circuit 21. The first D.C. component detector 6 is connected to the adding point 28b through an integrator 22.

A third control circuit 31 has the same construction as the first control circuit 11. Namely, it has adding points 38a, 38b, a controller 33, a triangular carrier wave generator 34, a comparator 35, drivers 36, 37 and an inversion amplifier 39. The third-phase output of the PT 5 and a third reference sine wave generator 30 are connected to the adding point 38a of the third control circuit 31. The second D.C. component detector 7 is connected to the adding point 38b through an integrator 32.

The first, second and third reference sine wave generator 10, 20 and 30 generate sine-wave voltages at 120° phase difference.

The operation of this embodiment is as follows. The D.C. voltage supplied from the D.C. power supply 2 is converted into 3-phase A.C. voltage through the inverter 1, and is supplied to the primary winding of the output transformer 4 through the first-, second- and third-phase output lines 41, 42 and 43. The voltages of the respective phases generated in the secondary winding are detected by the PT 5.

The first-phase output detected by the PT 5 is input to the adding point 18a of the first control circuit 11 at which a difference between the first-phase output and the first-phase reference sine waveform generated by the first reference sine wave generating circuit 10 is determined. This difference is amplified by the controller 13 and is compared in the comparator 15 with the triangular carrier wave derived from the triangular carrier wave generator 14. The first-phase switching elements UP and UN of the inverter 1 are then operated by drivers 16 and 17 in accordance with the output from the comparator 15. Thus, the switching elements UP and UN are alternately turned on and off in such a manner that a coincidence is obtained between the first-phase output detected by the PT 5 and the first-phase reference sine wave voltage.

Similarly, the second-phase output detected by the PT 5 is input to the adding point 28a of the second control circuit 21. The second control circuit 21 performs a control of the second-phase switching elements VP and VN to alternately turn them on and off in such a manner that the second-phase output coincides with the second-phase reference waveform voltage generated by the second reference sine waveform generator 20. Meanwhile, the first D.C. component detector 6 detects the D.C. component contained in the voltage between the first-phase output line 41 and the second-phase output line 42 of the inverter 1. The thus detected D.C. component is integrated by the integrator 22 and the integrated value is supplied to the adding point 28b of the second control circuit 21. In consequence, an amount corresponding to the integrated value obtained through the integrator 22 is subtracted from the output of the controller 23. In other words, a correction is conducted to eliminate the D.C. component. Consequently, the second-phase output is controlled in such a manner that the D.C. component of the voltage between the first- and second-phase outputs of the inverter 1 is nullified.

A similar control is effected on the third-phase output of the inverter 1 such that the D.C. component of the voltage between the first- and third-phase outputs of the inverter 1 is zero. Namely, the third-phase switching elements WP and WN of the inverter 1 are alternately turned on and off such that a coincidence is obtained between the third-phase output from the PT 5 and the third-phase reference sine wave voltage generated by the third reference sine waveform generator 30. It is to be understood, however, the second D.C. component detector 7 detects the D.C. component of the voltage between the first-phase output line 41 and the third-phase output line 43 of the inverter 1, and the detected D.C. component is integrated by the integrator 32 and the signal representing the integrated value is supplied to the adding point 38b, whereby the correction for the D.C. component is effected.

Figure 2:
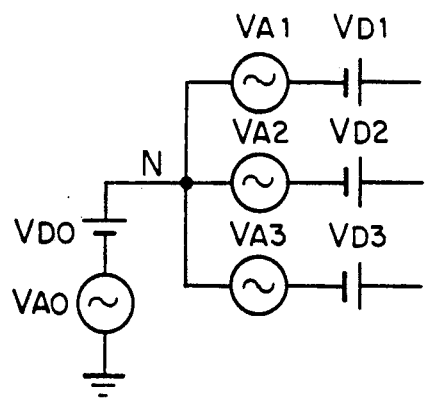
FIGS. 2 and 3 are illustrations of operation of the embodiment shown in FIG. 1.
Figure 3:
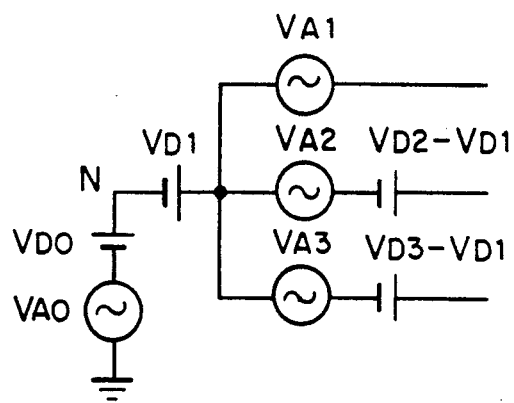
Figure 5:
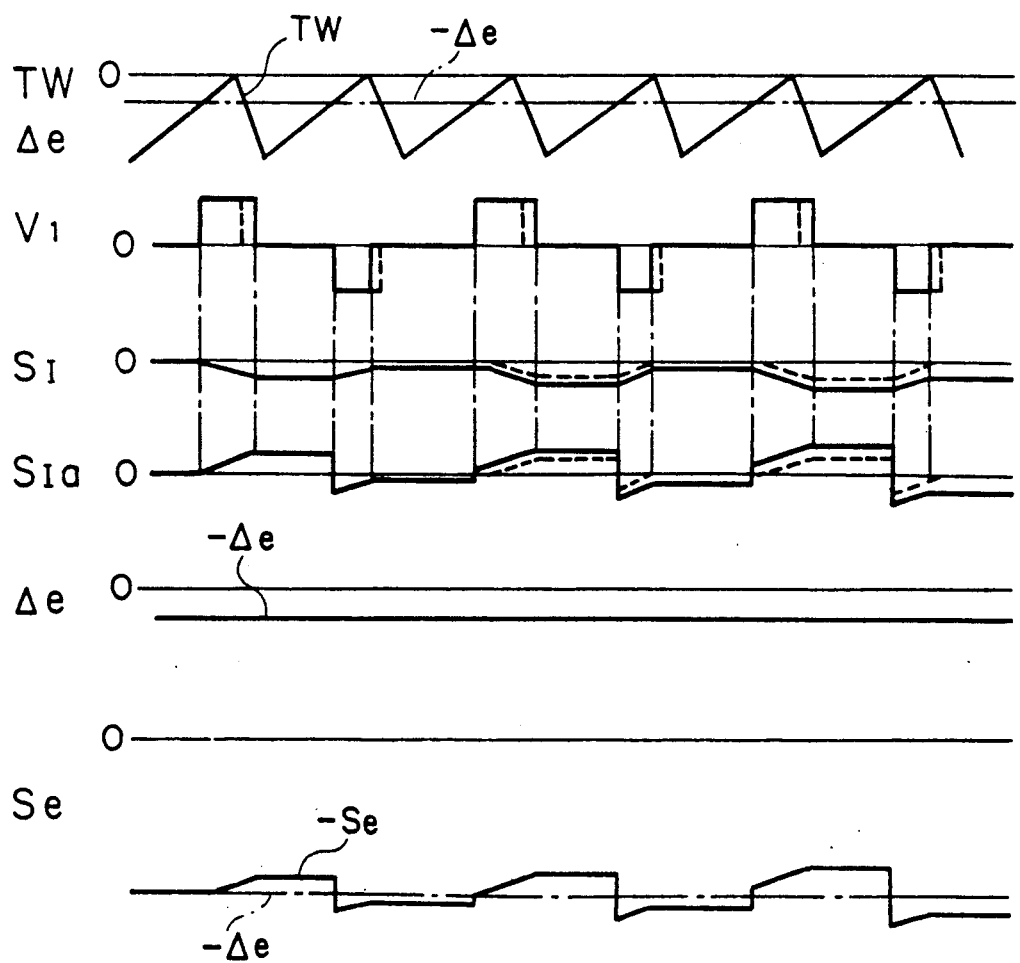
FIG. 5 is a waveform chart showing waveforms of various signals in the inverter shown in FIG. 4. DESCRIPTION OF THE PREFERRED EMBODIMENTS Embodiments of the present invention will be described hereinunder with reference to the accompanying drawings.
Figure 4:
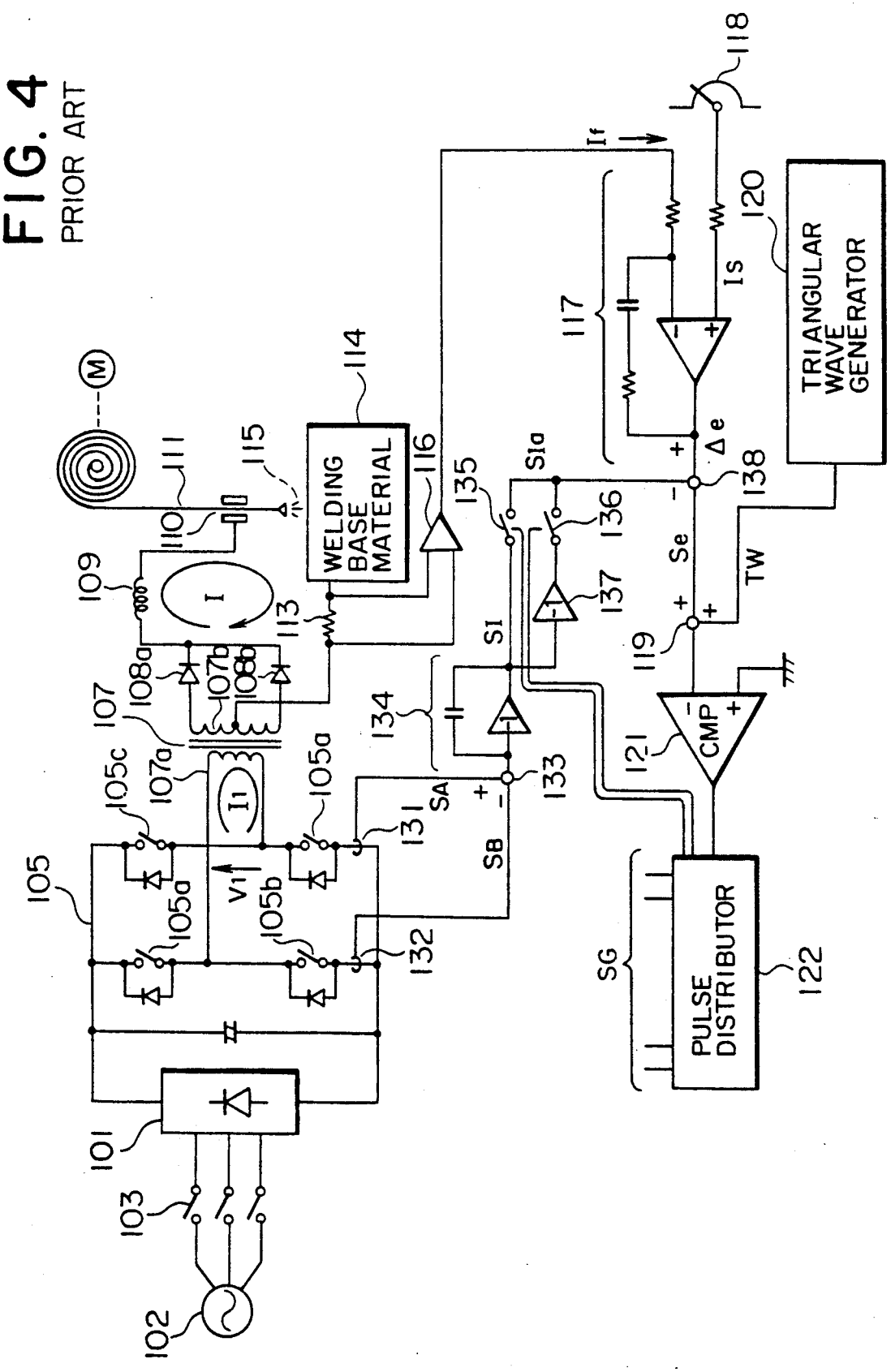
FIG. 4 is a block diagram of a single-phase inverter having a conventional D.C. component removing device.

The operation of the embodiment will be described in more detail with reference to FIGS. 2 and 3. FIG. 2 equivalently shows the three-phase outputs from the inverter 1. In this Figure, the A.C. voltage of an imaginary neutral point N of the inverter 1 and the A.C. voltages of the first, second and third phases are represented by $V_{A0}$, $V_{A1}$, $V_{A2}$ and $V_{A3}$, respectively. The D.C. component of the imaginary neutral point N and the D.C. components of the first, second and the third phases are represented by $V_{D0}$, $V_{D1}$, $V_{D2}$ and $V_{D3}$, respectively.

In regard to the D.C. excitation of the output transformer 4, it suffices to take into account the D.C. voltages between the output lines. FIG. 3 is a circuit diagram which is obtained by transforming the circuit of FIG. 2 on the basis of the D.C. component of the first phase. In this Figure, $V_{D2}-V_{D1}$ represents the D.C. component of the voltage between the second-phase output line 42 and the first-phase output line 41 of the inverter, while $V_{D3}-V_{D1}$ represents the D.C. component of the voltage between the third-phase output line 43 and the first-phase output line 41 of the inverter. These D.C. components are respectively detected by the first and second D.C. component detectors 6 and 7 and integrated respectively by the integrators 22 and 32. By correcting the control of the output of the inverter 1 in accordance with the integrated values derived from the integrators 22 and 32, it is possible to always maintain the D.C. components $V_{D2}-V_{D1}$ and $V_{D3}-V_{D1}$ zero.

As has been described, according to the present invention, it is possible to eliminate D.C. components of the voltages between the first-phase output and the second-phase output of the inverter and between the first-phase output and the third-phase output of the same, using the first-phase output of the inverter 1 as the reference or base. Thus, the D.C. components of the 3-phase outputs of the 3-phase inverter are made possible by controlling the voltages of two phases out of the three phases. In addition, no interference takes place between different phases.

Each of the D.C. component detectors 6 and 7 may be of the type which employs an insulated differential amplifier or a detector of the type disclosed in Japanese Patent Laid-Open No. 63-198581 which employs a saturable reactor.

Although a three-phase inverter has been described by way of example, it is to be noted that the described embodiment is only illustrative and the present invention can be applied to various types of multi-phase inverter.

What is claimed is:

1. A device for removing D.C. components from output voltages of a multi-phase inverter which converts a D.C. voltage into first to N-th phases of A.C. voltage, comprising:

first to (N−1)th detectors connected between the first-phase output line of said multi-phase inverter and the second- to N-th-phase output lines of said multi-phase inverter, respectively; and control means for respectively controlling the second- to N-th-phase output voltages of said inverter in such a manner that the D.C. components detected by said first to (N−1)th detectors are nullified.

2. A device according to claim 1, wherein said control means include first to (N−1)th integrators for integrating, respectively, the D.C. components detected by said first to (N−1)th detectors.

3. A device according to claim 1, wherein said detectors incorporate insulated differential amplifiers.

4. A device according to claim 1, further comprising first to N-th sine wave generators connected to said first to N-th control circuits respectively.

5. A device for removing D.C. components from output voltages of a multi-phase invertor which converts a D.C. voltage into first to N-th phases of A.C. voltage, comprising:

a phase voltage detector connected to first to N-th phase output lines of the multi-phase invertor;

first to (N−1)th D.C. voltage detectors connected between the first phase output line of said multi-phase invertor and the second to N-th phase output lines of said multi-phase invertor, respectively;

first to N-th control circuits connected to said phase voltage detector, each control circuit including a controller for amplifying an input signal and a wave generating circuit both connected to a comparator which is connected to the invertor through a number of drivers; and first to (N−1)th integrators connected to said second to N-th control circuits.

* * * * *